United States Patent
Fujimoto

(10) Patent No.: US 9,610,505 B2
(45) Date of Patent: Apr. 4, 2017

(54) GAME DEVICE, GAME SYSTEM, GAME CONTROL METHOD, AND INFORMATION STORAGE MEDIUM

(71) Applicant: KONAMI DIGITAL ENTERTAINMENT CO., LTD., Minato-ku, Tokyo (JP)

(72) Inventor: Kosuke Fujimoto, Nerima-ku (JP)

(73) Assignee: KONAMI DIGITAL ENTERTAINMENT CO., LTD., Minato-ku, Tokyo (JP)

( * ) Notice: Subject to any disclaimer, the term of this patent is extended or adjusted under 35 U.S.C. 154(b) by 613 days.

(21) Appl. No.: 13/956,835

(22) Filed: Aug. 1, 2013

(65) Prior Publication Data

US 2014/0038696 A1    Feb. 6, 2014

(30) Foreign Application Priority Data

Aug. 3, 2012    (JP) .................................. 2012-172839

(51) Int. Cl.
  *A63F 13/00*    (2014.01)
  *A63F 13/795*    (2014.01)
  (Continued)

(52) U.S. Cl.
  CPC ............ *A63F 13/795* (2014.09); *A63F 13/10* (2013.01); *A63F 13/12* (2013.01); *A63F 13/335* (2014.09); *A63F 13/48* (2014.09)

(58) Field of Classification Search
  CPC ..... A63F 13/00; A63F 13/48; A63F 2300/636
  (Continued)

(56) References Cited

U.S. PATENT DOCUMENTS 6,634,948 B1 * 10/2003 Hayashi .................. A63F 13/12
                                                                463/40
6,699,125 B2 * 3/2004 Kirmse .................... A63F 13/12
                                                                463/42
(Continued)

FOREIGN PATENT DOCUMENTS

JP    2003-340161 A    12/2003
JP    2007-117340 A    5/2007
(Continued)

OTHER PUBLICATIONS

Partial translation of communication dated Aug. 5, 2014, issued by the Japanese Patent Office in counterpart Japanese application No. 2012-172839.

*Primary Examiner* — Jay Liddle
*Assistant Examiner* — Ryan Hsu
(74) *Attorney, Agent, or Firm* — Sughrue Mion, PLLC

(57) ABSTRACT

Provided is a game device for executing a game in which a user participates and another user is allowed to join the game in mid-game. The game device obtains stored data from a unit for storing data that indicates a situation of the game being executed and that is updated with progress of the game. A situation determining unit determines whether or not the situation of the game being executed satisfies a given condition. A mid-game joining restricting unit keeps a user who has not joined the game being executed from joining the game in mid-game, based on a result of the determination of the situation determining unit.

20 Claims, 8 Drawing Sheets

(51) Int. Cl.
*A63F 13/40* (2014.01)
*A63F 13/30* (2014.01)
*A63F 13/48* (2014.01)
*A63F 13/335* (2014.01)

(58) Field of Classification Search
USPC .......................................................... 463/42
See application file for complete search history.

(56) References Cited

U.S. PATENT DOCUMENTS

| 7,789,741 B1 * | 9/2010 | Fields ..................... A63F 13/10 |
| | | 463/2 |
| 2008/0220878 A1 * | 9/2008 | Michaelis ............... A63F 13/12 |
| | | 463/42 |
| 2009/0124388 A1 | 5/2009 | Onuki et al. |

FOREIGN PATENT DOCUMENTS

| JP | 2007-215751 A | 8/2007 |
| JP | 2010-042083 A | 2/2010 |
| JP | 2011-182895 A | 9/2011 |

* cited by examiner

FIG.4

| COMPETITION ROOM ID | COMPETITION ROOM INFORMATION ||| |
|---|---|---|---|
| | COMPETITION ROOM NAME | PARTICIPATING USER | GAME SITUATION |
| 1 | A | 001,002·· | SITUATION A |
| 2 | B | 051,056·· | — |
| 3 | C | 102,034·· | SITUATION B |
| ⋮ | ⋮ | ⋮ | ⋮ |

FIG.7

| PATTERN | SITUATION |
|---|---|
| FARING POORLY | SCORE DIFFERENCE IS TWO POINTS OR MORE |
| STANDSTILL | NO POINTS SCORED FOR THIRTY MINUTES OR LONGER |
| ⋮ | ⋮ |

FIG.8

| PLAY PATTERN | GAME PLAY |
|---|---|
| AGGRESSIVE | SHOOT COUNT IS FIVE OR HIGHER |
| FAVOR PASSES | PASS COUNT IS TEN OR HIGHER |
| ⋮ | ⋮ |

FIG.9

| SITUATION | PLAY PATTERN |
|---|---|
| FARING POORLY | AGGRESSIVE |
| ⋮ | ⋮ |

FIG.10

| USER | USER WHO JOINED MID-GAME |
|---|---|
| 001 | 007,009··· |
| 002 | 007,009··· |
| ⋮ | ⋮ |

GAME DEVICE, GAME SYSTEM, GAME CONTROL METHOD, AND INFORMATION STORAGE MEDIUM

CROSS-REFERENCE TO RELATED APPLICATION

The present application claims priority from Japanese application JP 2012-172839 filed on Aug. 3, 2012, the content of which is hereby incorporated by reference into this application.

BACKGROUND OF THE INVENTION

1. Field of the Invention

The present invention relates to a game device, a game system, a game control method, and an information storage medium.

2. Description of the Related Art

Game devices for executing a video game in which a plurality of users participate have been hitherto known. Japanese Patent Application Laid-open No. 2007-117340, for example, describes a game device for executing an online soccer game in which a plurality of users compete with one another.

In a game that is of the type described above and that allows a user to join the game in mid-game, not permitting a user to join the game in mid-game is preferred depending on the situation of the game that is being executed. For instance, in the online soccer game of Japanese Patent Application Laid-open No. 2007-117340, a user who joins the game in mid-game may fail to fully grasp the situation of the match immediately after the user joins the game in mid-game and cause the user's team to lose score points, or when the remaining time period of the match is short the user may not have a chance to really take an active part.

SUMMARY OF THE INVENTION

One embodiment of the present invention has been made in view of the problem described above, and an object of the present invention is therefore to provide a game device, a game system, a game control method, and an information storage medium, which enable a user to join, in mid-game, a game that is being executed depending on the situation of the game.

In order to solve the above-mentioned problem, according to one embodiment of the present invention, there are provided a game device (1) and system (S) for executing a game in which a user participates and another user is allowed to join the game in mid-game, the game device (1) and the game system (S) each including: means (52) for obtaining stored data from means for storing data that indicates a situation of the game being executed and that is updated with progress of the game; situation determining means (56) for determining whether or not the situation of the game being executed satisfies a given condition; and mid-game joining restricting means (58) for keeping a user who has not joined the game being executed from joining the game in mid-game, based on a result of the determination of the situation determining means (56).

According to one embodiment of the present invention, there is also provided a game control method for controlling a game in which a user participates and another user is allowed to join the game in mid-game, the game control method including: obtaining stored data from a storage for storing data that indicates a situation of the game being executed and that is updated with progress of the game; determining whether or not the situation of the game being executed satisfies a given condition; and keeping a user who has not joined the game being executed from joining the game in mid-game, based on a result of the determination.

According to one embodiment of the present invention, there is also provided a program for causing a computer for executing a game in which a user participates and another user is allowed to join the game in mid-game to function as: means (52) for obtaining stored data from means for storing data that indicates a situation of the game being executed and that is updated with progress of the game; situation determining means (56) for determining whether or not the situation of the game being executed satisfies a given condition; and mid-game joining restricting means (58) for keeping a user who has not joined the game being executed from joining the game in mid-game, based on a result of the determination of the situation determining means (56).

According to one embodiment of the present invention, there is provided a non-transitory computer-readable information storage medium having stored thereon the program described above.

According to one embodiment of the present invention, the user is allowed to join, in mid-game, the video game that is being executed depending on the situation of the game.

According to the one embodiment of the present invention, the situation determining means (56) determines whether or not the situation of the game being executed satisfies the given condition by comparing the situation of the game being executed and a given situation.

According to the one embodiment of the present invention, the game is a game in which the progress of the game is paused in a case where the situation of the game reaches a given situation, and the situation determining means (56) determines whether or not the situation of the game being executed satisfies the given condition by determining whether or not the progress of the game being executed is paused.

According to the one embodiment of the present invention, the game device (1) further includes means (60) for receiving designation of a situation of the game which is designated by a user who has participated in the game, and the situation determining means (56) determines whether or not the situation of the game being executed satisfies the given condition by comparing the situation of the game being executed and the situation designated by the user who has participated in the game.

According to the one embodiment of the present invention, the game device (1) further includes means (52) for obtaining information about past game play of a user who has not joined the game, and the situation determining means (56) determines whether or not the situation of the game being executed satisfies the given condition based on the situation of the game being executed and the information about past game play of the user who has not joined the game.

According to the one embodiment of the present invention, the game device further includes means (52) for obtaining what is stored in means for storing users who have participated in the game executed in the past in association with one another, and the situation determining means (56) determines whether or not the situation of the game being executed satisfies the given condition by comparing another user who is associated with a user participating in the game that is being executed with a user who is not participating in the game.

According to the one embodiment of the present invention, the game is a game that ends in a case where a given end time arrives, and the situation determining means (56) determines whether or not the situation of the game being executed satisfies the given condition by determining whether or not a remaining time period till the given end time of the game is equal to or longer than a reference time period.

According to the one embodiment of the present invention, the game device (1) further includes receiving means (62) for receiving a mid-game joining request to join the game in mid-game which is issued by a user who has not joined the game, and the mid-game joining restricting means (58) keeps the user who has not joined the game being executed from joining the game in mid-game by restricting the reception of the mid-game joining request by the receiving means (62) based on the result of the determination of the situation determining means (56).

According to the one embodiment of the present invention, the game device (1) further includes suggestion means (64) for suggesting joining the game in mid-game to a user who has not joined the game, and the mid-game joining restricting means (58) keeps the user who has not joined the game being executed from joining the game in mid-game by restricting the suggestion by the suggestion means (64) based on the result of the determination of the situation determining means (56).

According to the one embodiment of the present invention, the suggestion means (64) presents the situation of the game being executed to the user who has not joined the game, to thereby suggest joining the game in mid-game to the user who has not joined the game.

According to the one embodiment of the present invention, the game device (1) further includes gathering request determining means (60) for determining whether or not a gathering request to gather a user who has not joined the game has been received from a user who is participating in the game during a period in which the game is being executed, and the mid-game joining restricting means (58) keeps the user who has not joined the game being executed from joining the game in mid-game based on the result of the determination of the situation determining means (56) and a result of the determination of the gathering request determining means (60).

According to the one embodiment of the present invention, the game device further includes vote receiving means (56) for receiving, in a case where it is determined that the gathering request has been received, a vote from a user who is participating in the game, except the user who has issued the gathering request, and the mid-game joining restricting means (58) keeps the user who has not joined the game being executed from joining the game in mid-game based on the result of the determination of the situation determining means (56) and a result of the vote received by the vote receiving means (56).

According to the one embodiment of the present invention, the vote receiving means (56) receives the vote from the user who is participating in the game except the user who has issued the gathering request within a period that is set in a case where the gathering request has been received.

According to the one embodiment of the present invention, the game device (1) further includes means (66) for giving a reward to a user who joins the game, which gives a higher reward to a user who joins the game in mid-game in response to the gathering request than in a case where the user joins the game in mid-game without being requested by the gathering request.

According to the one embodiment of the present invention, the game device (1) further includes: means (60) for receiving designation of a condition about a user who joins the game in mid-game from a user who is participating in the game during a period in which the game is being executed; and means (64) for presenting the designated condition to the user who has not joined the game.

According to the one embodiment of the present invention, the game device (1) further includes: before-after comparing means (62) for comparing, in a case where there is a user who joins the game in mid-game, the situation of the game before the user joins the game in mid-game and the situation of the game after the user joins the game in mid-game; and means (66) for evaluating game play of the user who joins the game in mid-game based on a result of the comparison made by the before-after comparing means (56).

According to the one embodiment of the present invention, the game in which a plurality of users participate and each user belongs to one of a plurality of groups, and the game device (1) further includes means (54) for determining to which group a user who joins the game in mid-game belongs, based on the number of users of each group.

In the description given above, reference symbols used in the accompanying drawings are written in parentheses in order to facilitate the understanding of the present invention. This, however, does not limit the game device, game system, game control method, and information storage medium according to one embodiment of the present invention to illustrated modes.

BRIEF DESCRIPTION OF THE DRAWINGS

In the accompanying drawings:

FIG. 4 is a figure illustrating an example of competition room data;

FIG. 7 is a figure illustrating game situation patterns;

FIG. 8 is a figure illustrating users' game play patterns;

FIG. 9 is a figure illustrating the association between a game situation and information about game play; and FIG. 10 is a figure illustrating the association between users who participate in a game.

DETAILED DESCRIPTION OF THE INVENTION

1. Hardware Structure of the Game System

Figure 1:
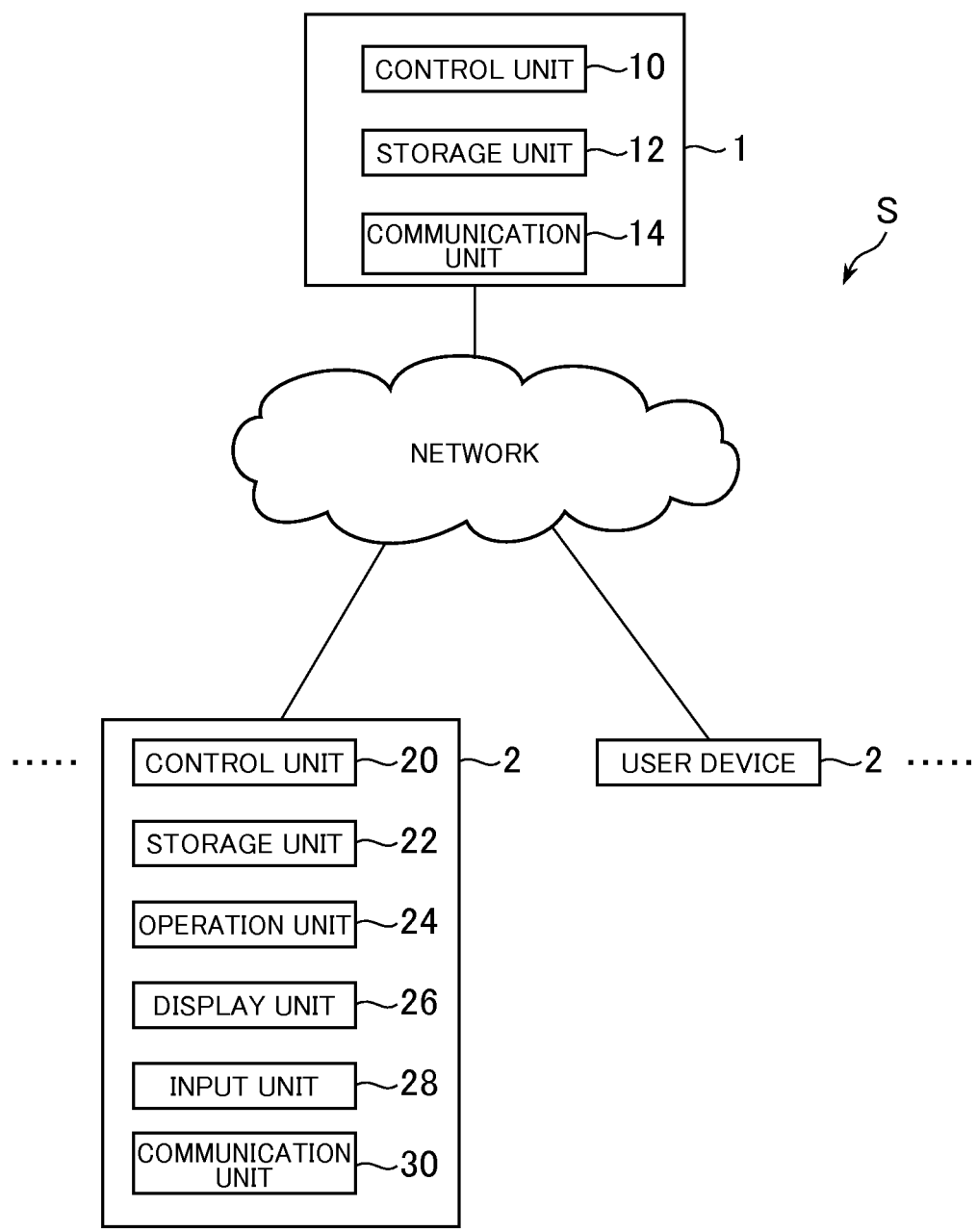
FIG. 1 is a diagram illustrating the overall configuration of a game system according to an embodiment of the present invention.

Now, one embodiment (an embodiment) of the present invention is described in detail with reference to the accompanying drawings. FIG. 1 is a diagram illustrating the overall configuration of a game system S according to the embodiment of the present invention. As illustrated in FIG. 1, the game system S includes, for example, a game server 1 (game device) and a plurality of user devices 2. The respective devices included in the game system S are connected to one another via a network so as to be able to perform data communications.

The game server 1 is, for example, a known server computer. As illustrated in FIG. 1, the game server 1 includes a control unit 10, a storage unit 12, and a communication unit 14. Note that in addition, the game server 1 may include a keyboard (not shown), a monitor (not shown), and a reading device (not shown) for an information storage medium.

The control unit 10 includes, for example, a CPU. The control unit 10 executes programs stored in the storage unit 12 to perform various kinds of processing, and transmits/receives various kinds of data to/from the user device 2 via the communication unit 14. The storage unit 12 includes, for example, a hard disk drive or a memory such as a RAM. The storage unit 12 stores various programs including a game program, various kinds of data, and the like. The communication unit 14 is, for example, a communication device such as a network card.

The user device 2 is implemented by a known computer. Examples of the user device 2 include a consumer game machine, an arcade game machine, a mobile phone (smartphone), and a personal computer. As illustrated in FIG. 1, the user device 2 includes a control unit 20, a storage unit 22, an operation unit 24, a display unit 26, an input unit 28, and a communication unit 30. Note that the user device 2 may include other components (not shown).

The control unit 20, the storage unit 22, and the communication unit 30 are the same hardware structures as the control unit 10, the storage unit 12, and the communication unit 14, respectively, and hence descriptions thereof are omitted. The operation unit 24 includes a controller and a keyboard, and transmits a description of the user's operation to the control unit 10. The display unit 26 includes a liquid crystal display panel, and displays various screens in accordance with an instruction issued by the control unit 10. The input unit 28 includes a DVD reproducer, and receives inputs of various kinds of data from an external storage device.

2. Games Executed in the Game System

The game system S executes a game in which a plurality of users participate (cooperate or compete with one another) and which allows other users to join the game in mid-game. In this embodiment, a soccer game in which a plurality of users participate is executed. For example, a plurality of competition rooms are prepared for the soccer game, and each user joins the soccer game by entering one of these competition rooms.

Figure 2:
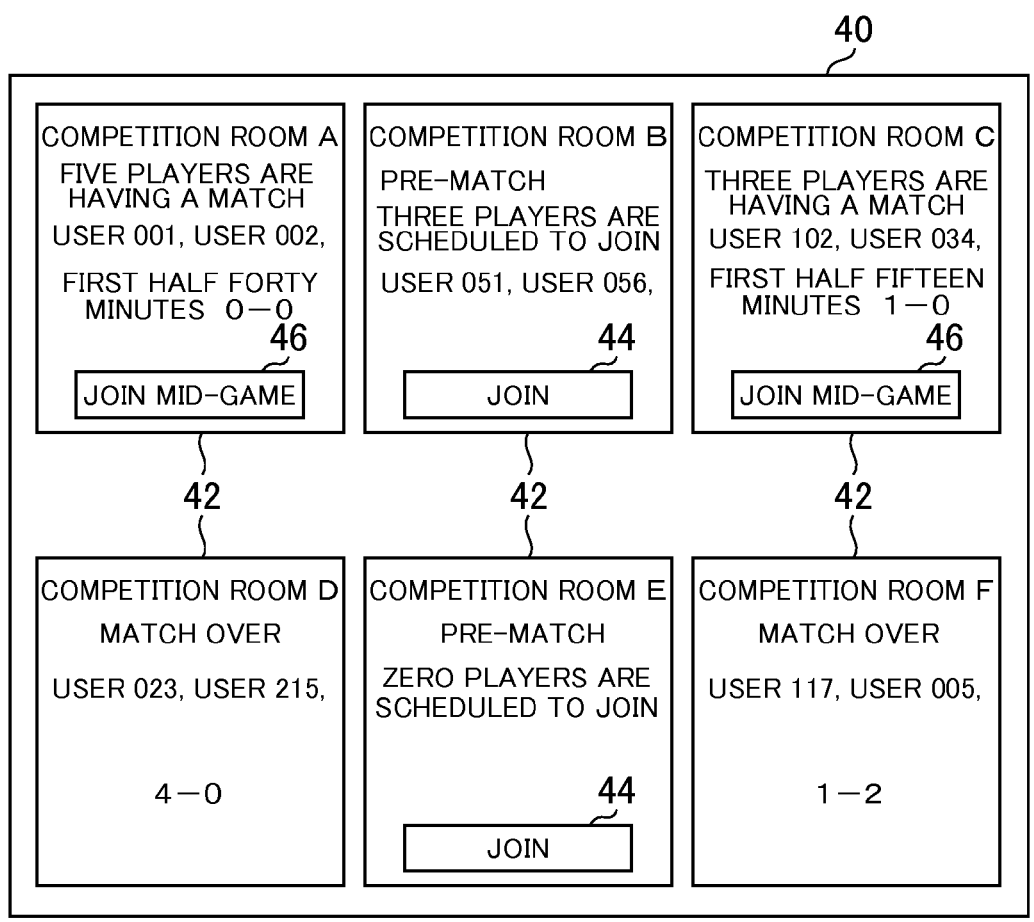
FIG. 2 is a figure illustrating an example of a competition room screen which is displayed on a display unit.

FIG. 2 is a figure illustrating an example of a competition room screen which is displayed on the display unit 26. As illustrated in FIG. 2, the competition room screen, which is denoted by 40, displays detailed information images 42 which indicate various types of information about the respective competition rooms. Each detailed information image 42 displays the state of a soccer match that a user who enters the competition room joins.

Each competition room here takes three states, "pre-match", "mid-match", and "match over". "Pre-match" is the state prior to the start of a soccer match in the competition room, and a competition room in the "pre-match" state waits for users who participate in the soccer match. "Mid-match" is the state in which a soccer match in the competition room is being executed, and users participating in the soccer match are playing the game. "Match over" is the state in which a soccer match in the competition room has ended, and game play by users who have participated in the soccer match has been finished. In this embodiment, "entering a competition room" is synonymous with "joining a match".

Each detailed information image 42 includes the number of users who participate in a match in the competition room in question, and the names of the participating users. A competition room in the "pre-match" state displays a "join" button 44 which is provided for a user to join the room's match. When a user who is yet to join the game selects the "join" button 44 on the competition room screen 40, the user is allowed to join the room's match. Once users gather in a competition room that is in the "pre-match" state, the soccer game starts at given time, and a plurality of users who have entered the competition room are divided into a plurality of teams to play the soccer game.

In a competition room that is in the "match over" state, the game has ended which means that users cannot join the game in mid-game, and the result of the match fought in the competition room is displayed. The detailed information image 42 of a competition room in the "match over" state may be designed so that replay of the match can be viewed. The competition room screen 40 may be designed so that a competition room in the "competition over" state is erased after a given period of time passes since the end of the competition.

In a competition room that is in the "mid-match" state, a "join mid-game" button 46 is displayed which is provided for a user to join the room's match in mid-game. When a user who is yet to join the game selects the "join mid-game" button 46 on the competition room screen 40, the user is allowed to join, in mid-game, the match that is being executed under a given condition.

This embodiment is configured so that when a user selects the "join mid-game" button 46 for the soccer game being executed, the mid-game joining of the user remains until the soccer game reaches a given situation, thereby ensuring smooth joining of the user in mid-game. This configuration is described in detail below.

3. Functions Implemented by the Game System

Figure 3:
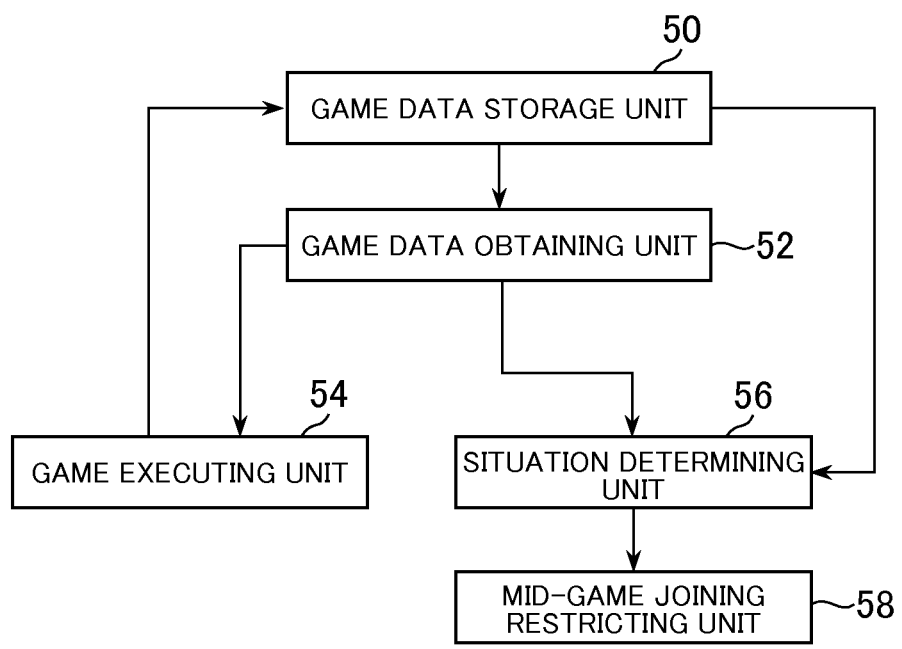
FIG. 3 is a functional block diagram of the game system.

FIG. 3 is a functional block diagram of the game system S. As illustrated in FIG. 3, the game system S includes a game data storage unit 50, a game data obtaining unit 52, a game executing unit 54, a situation determining unit 56, and a mid-game joining restricting unit 58. In this embodiment, those functions are implemented by the control unit 10 operating in accordance with the programs read from the storage unit 12. Of the above-mentioned functions, the game data storage unit 50 is implemented mainly by the storage unit 12, and the other respective functions are implemented mainly by the control unit 10.

3-1. Game Data Storage Unit

The game data storage unit 50 stores various types of data about a game in which a plurality of users participate. The game data storage unit 50 stores user data about each of the plurality of users and competition room data about each competition room.

The information relating to each user who uses the game system S is stored as the user data. For example, the user data is associated with a user ID for identifying the user and various kinds of information (for example, personal information such as a user name) relating to the user. The user data may include, for each user, information indicating whether or not the user is participating in a game at present, information for identifying a competition room the user is in, and the like.

FIG. 4 is a figure illustrating an example of the competition room data. As illustrated in FIG. 4, the competition room data indicates the situation of each competition room. In the competition room data here, for each competition room, a competition room ID for identifying the competition room is stored in association with information about the competition room. The competition room screen 40 is generated based on the competition room data.

The information about a competition room here includes the name of the competition room, the user IDs of users who are in the competition room, and game situation data which indicates the situation of the room's match being executed. The game situation data indicates the current situation of the room's soccer match, and is updated in a manner that reflects the operation of the respective users. The game situation data includes, for example, the user IDs of users belonging to the respective teams, the state (location, posture, and the like) of a character placed in the game space, a parameter about the character, the state of a moving object (the location, traveling direction, and the like of the ball), the current situation of the match, and the elapsed time period of the match.

Once users perform a given operation for generating a competition room, a new record is created in the competition room data. When a user performs an operation for entering the competition room, the user is added to the record of the competition room. The arrival of given start time starts a match in the competition room, and the game situation data is generated at this point. The game situation data is updated with the progress of the match.

Data stored in the game data storage unit 50 is not limited to the example given above. Other examples of data that may be stored in the game data storage unit 50 include various types of image data displayed on the competition room screen 40, and a list showing the IP addresses of the user devices 2 that are operated by the respective users.

3-2. Game Data Obtaining Unit

The game data obtaining unit 52 obtains data stored in means for storing data that indicates the situation of a game being executed and that is updated with the progress of the game (e.g., the game situation data) (e.g., the game data storage unit 50).

3-3. Game Executing Unit

The game executing unit 54 executes a game that allows a user to join, in mid-game, a game in which other users are participating. For example, the game executing unit 54 lets a game progress by executing various types of processing that are written in a game program, based on operation performed by users who participate in the game, and updates data that is stored in the game data storage unit 50 and that indicates the situation of the game being executed.

The game executing unit 54 in this embodiment executes a game that pauses its progress when arriving at a given situation. The state in which "the progress of a game is paused" is a state in which an update to the game situation data is restricted, in other words, a state in which the progress of the game in response to users' operation is stopped.

The game executing unit 54 determines, based on the game situation data, whether or not a suspension condition for pausing the progress of a game is satisfied. When the suspension condition is satisfied, the game executing unit 54 pauses the progress of the game being executed. In the case where a soccer game is executed as in this embodiment, the suspension condition is, for example, whether or not a moving object is at a given location (e.g., whether or not a ball is outside the pitch), or whether or not a character has committed a foul.

The game executing unit 54 allows a user who has not joined a game in which at least one user is participating to join the game in mid-game. For example, the game executing unit 54 allows a user who has not joined a game to join the game in mid-game by adding the user ID of the user to the competition room data. A user joining a game mid-game means that a user joins a match in a competition room after the match is started, in other words, a change from a state in which an update to the game situation data in a manner that reflects users' operation is not made to a state in which the game situation data is updated in a manner that reflects users' operation.

3-4. Situation Determining Unit

The situation determining unit 56 determines whether or not the situation of a game being executed satisfies a given condition. This condition is a condition about the situation of a game being executed, and is a condition indicating whether or not the value of the game situation data is a given value.

The situation determining unit 56 in this embodiment determines whether or not the situation of a game being executed satisfies a given condition by comparing the situation of the game being executed with a given situation. When it is determined that the situation of the game being executed equals the given situation, the given condition is satisfied.

The situation determining unit 56 determines whether or not the situation of a game being executed satisfies a given condition by determining, for example, whether or not the progress of the game being executed has been paused. When it is determined that the progress of the game being executed has been paused, the given condition is satisfied.

3-5. Mid-Game Joining Restricting Unit

The mid-game joining restricting unit 58 restricts the mid-game joining in a game being executed of a user who has not joined the game being executed, based on the result of the determination made by the situation determining unit 56. "Restricting the joining in a game in mid-game" is to keep a user from joining a game in mid-game and, in this embodiment, means that the joining of a user in mid-game is delayed.

The mid-game joining restricting unit 58 allows a user to join a game being executed mid-game when it is determined that the situation of the game satisfies a given condition, and keeps a user from joining a game being executed mid-game when it is determined that the situation of the game does not satisfy a given condition.

4. Processing Executed in the Game Server

Figure 5:
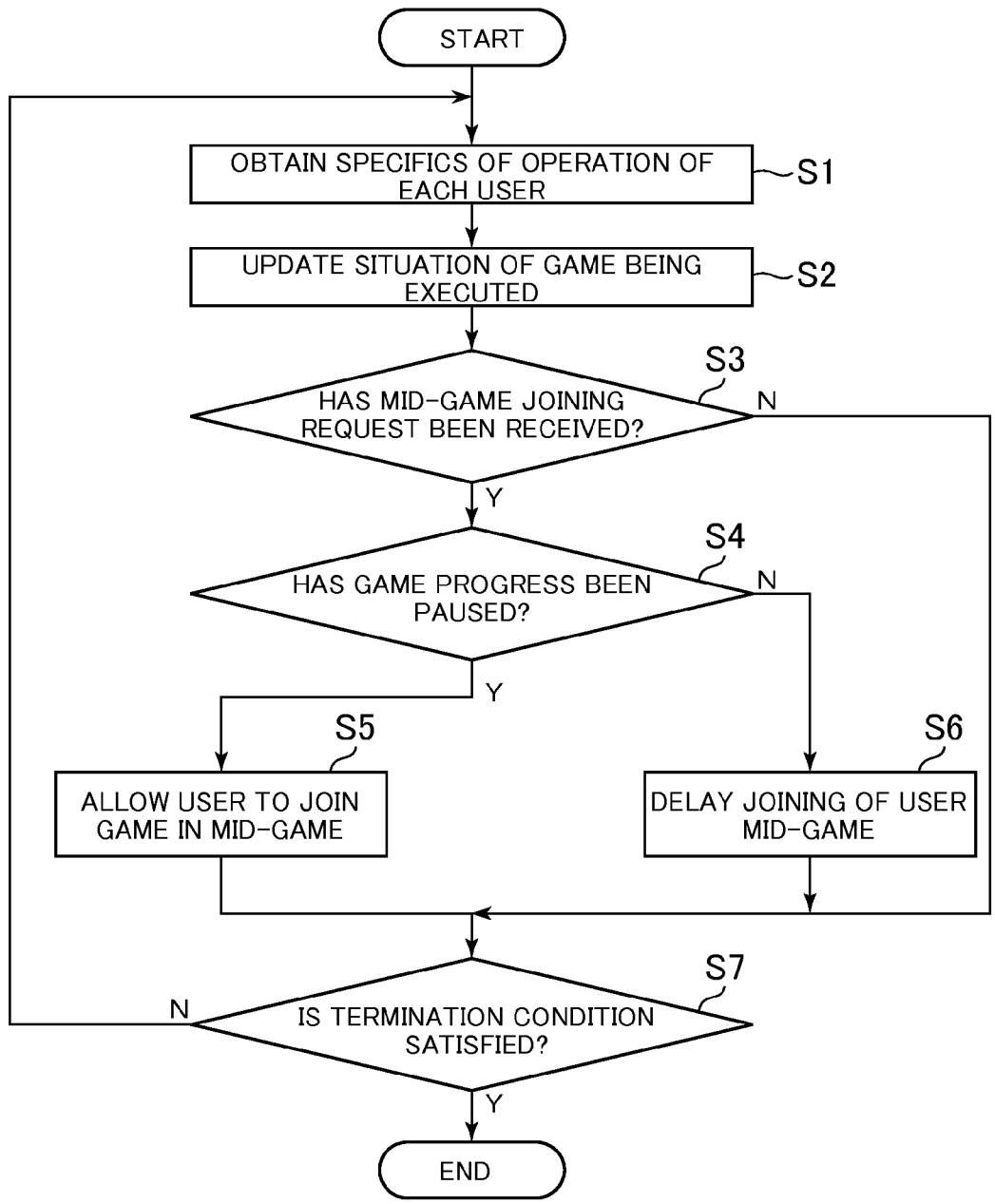
FIG. 5 is a flow chart illustrating an example of processing that is executed by a game server.

FIG. 5 is a flow chart illustrating an example of processing that is executed by the game server 1. The processing of FIG. 5 is executed by the control unit 10 which operates as programmed by a program read out of the storage unit 12.

The processing of FIG. 5 is executed for each competition room after a match is started in the competition room.

As illustrated in FIG. 5, the control unit 10 first obtains, for each user participating in the match, the specifics of an operation performed by the user from the user device 2 (S1). In S1, the control unit 10 identifies which user is participating in the match by referring to the competition room data. The control unit 10 receives information indicating the operation state of the operation unit 24 of the user device 2 that is operated by the identified user, thereby obtaining the specifics of operation of the user. In a case where the game server 1 acquires information from the user device 2, the user ID and the IP address are transmitted from the user device 2. The game server 1 identifies which user of which user device 2 has access thereto by receiving the user ID and the IP address.

The control unit 10 updates the situation of the game being executed based on the operation specifics obtained in S1 (S2). In S2, the control unit 10 executes various types of processing written in a game program based on the operation specifics of the respective users, to thereby let the game progress. The control unit 10 updates the game situation data of the competition room with the progress of the game. The game situation data updated in S2 may be distributed to the user devices 2 of the respective users, or only image data of a game screen generated based on the game situation data may be distributed to the user devices 2.

The control unit 10 determines whether or not a mid-game joining request has been received from the user device 2 of a user who has not joined the game (S3). In S3, the control unit 10 determines whether or not information indicating that the "join mid-game" button 46 is selected has been received from the user device 2.

When determining that a mid-game joining request for the game has been received (S3: Y), the control unit 10 determines whether or not the progress of the game being executed has been paused (S4). In S4, the control unit 10 determines whether or not the progress of the game being executed has been paused by determining, for example, whether or not the ball is at a given location (e.g., outside the pitch), or whether or not a character has committed a foul.

When determining that the game being executed has been paused (S4: Y), the control unit 10 allows the user from which the mid-game joining request has been received to join the game in mid-game (S5). In S5, the control unit 10 adds the user ID of the user who has issued the mid-game joining request to the competition room data. The control unit 10 subsequently receives the specifics of operation from the user device 2 of this user and updates the game situation data. The updated game situation data, or image data of a game screen generated based on the updated game situation data, is distributed to the user device 2 of the user who has joined mid-game.

In the case where it is determined that the game being executed has not been paused (S4: N), on the other hand, the control unit 10 does not execute S5 and delays the mid-game joining of the user (S6). In other words, the control unit 10 keeps the user from joining the game in mid-game. In S6, the control unit 10 delays the mid-game joining of the user by temporarily storing in the storage unit 12 information for identifying the user who has issued the mid-game joining request. Subsequently, when it is determined in S4 that the progress of the game has been paused, S5 is executed to allow the user whose joining mid-game has been delayed to join the game in mid-game.

In the case where it is determined that a request to join the game in mid-game has not been received (S3: N), on the other hand, the control unit 10 determines whether or not a termination condition is satisfied (S7). The termination condition is a given condition that is determined to end this processing. In the case of a soccer match, for example, whether or not the time period elapsed from the start of the game exceeds a given threshold time period is used as the termination condition. In the case where it is determined that the termination condition is not satisfied (S7: N), the processing returns to S1 and the execution of the game is continued. In the case where it is determined that the termination condition is satisfied (S7: Y), this processing is ended.

The game system S described above allows a user who has not joined a game being executed to join mid-game depending on the situation of the game. For instance, a user can join a game being executed mid-game under a situation where joining the game in mid-game is easy by allowing the user to join mid-game when the situation of the game is a given situation. A user can join mid-game more smoothly when the user is allowed to join mid-game while the progress of the game is paused as in this embodiment, than when the user is allowed to join mid-game while the game is in progress.

5. Modification Examples

The present invention is not limited to the embodiment described above, and can be modified suitably without departing from the spirit of the present invention.

Figure 6:
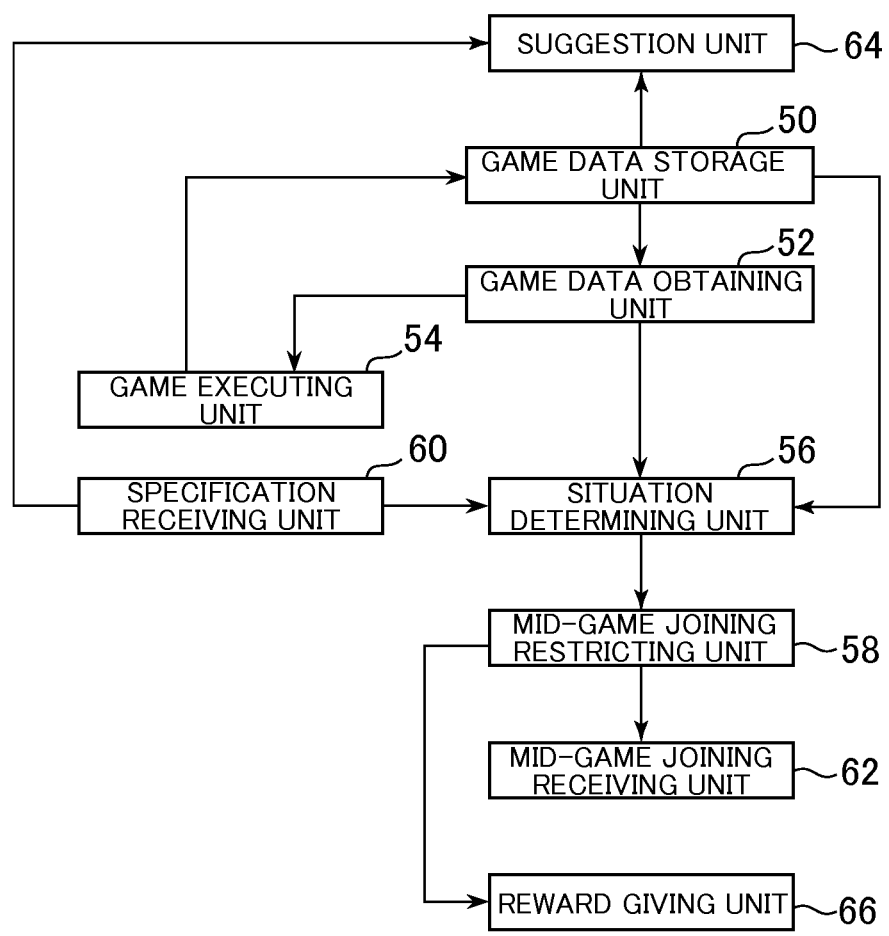
FIG. 6 is a functional block diagram of modification examples.

FIG. 6 is a functional block diagram of modification examples. As illustrated in FIG. 6, the game system S of each of the modification examples includes, in addition to the functions of the embodiment, a designation receiving unit 60, a mid-game joining receiving unit 62, a suggestion unit 64, and a reward giving unit 66. These functions are implemented mainly by the control unit 10.

(1) The description of the embodiment takes as an example a case where a user is allowed to join mid-game when the game being executed is paused. However, a condition for determining whether or not to allow a user who has not joined a game to join mid-game is not limited thereto, and can be any condition about the situation of the game.

(1-1) For instance, a user participating in a game or a user who has not joined the game may specify a game situation in advance so that the user is allowed to join mid-game when the game being executed reaches the designated situation. For example, a user who is good at scoring a goal specifies in advance a situation in which one of the teams is losing by a score difference of given points or more. When this user is allowed to join mid-game in a competition room where the score difference has reached the given points or more, the user can take an active part in the game.

The game system S of this modification example includes the designation receiving unit 60. The designation receiving unit 60 receives the designation of a game situation by a user (a user participating in a game or a user who has not joined the game). For instance, a plurality of patterns relating to game situations are prepared in the game data storage unit 50 in advance.

FIG. 7 is a figure illustrating game situation patterns. The plurality of patterns of FIG. 7 are presented to users. The presentation here means that information is output from the user devices 2 by video or audio. A user specifies a game situation by selecting at least one of the plurality of patterns presented. The designation receiving unit 60 identifies a pattern designated by a user and receives the designation of a game situation by obtaining the specifics of operation of the user.

The situation determining unit 56 of this modification example determines whether or not the situation of a game being executed satisfies a given condition by comparing the situation of the game being executed with a situation designated by a user. The situation determining unit 56 here determines whether or not the situation of a game being executed matches a situation pattern designated by a user who has not joined the game and, based on the result of the determination, determines whether or not the situation of the game being executed satisfies a given condition. For example, it is determined that the given condition is satisfied when the two situations match, and it is determined that the given condition is not satisfied when the two do not match.

According to the modification example (1-1), a user is allowed to join a game being executed mid-game depending on the result of a comparison between the situation of the game and a situation designated by the user. Each user can therefore join a game in mid-game under a situation that suits the preference of the user. The function of the designation receiving unit 60 that is described above is not indispensable and may be omitted.

While the situation determining unit 56 determines whether or not the situation of a game being executed matches a situation designated by a user in the case described above, the situation determining unit 56 may instead determine whether or not the two are similar. In other words, a user may be allowed to join a game being executed mid-game when the situation of the game does not match a situation designated by the user as long as the two are similar to each other.

In this case, the situation determining unit 56 determines whether or not the situation of a game being executed is similar to a situation designated by a user and, based on the result of the determination, determines whether or not the situation of the game being executed satisfies a given condition. For example, the association between a game situation and a situation similar to the game situation is stored in the game data storage unit 50. Data indicating the association may be in a mathematical expression format or a table format. The situation determining unit 56 determines whether or not the situation of a game being executed has reached a situation that is associated with a situation designated by a user, to thereby determine whether or not the situation of the game being executed is similar to the situation designated by the user.

The modification example described above deals with a case where each user specifies a game situation under which the user wishes to join the game. Instead, each user may specify a game situation under which the user does not wish to join the game, or a situation under which the user does not wish for other users to join mid-game. For instance, each user may specify a game situation where the user is not likely to have a chance take an active part if joining mid-game. In this case, too, similarly to the modification example described above, the situation determining unit 56 determines whether or not the situation of a game being executed satisfies a given condition by comparing the situation of the game being executed with a situation designated by a user. Specifically, it is determined that a given condition is satisfied when the two do not match or the two are not similar to each other.

(1-2) To give another example, the play style of each user may be stored so that a user who can take an active part under a particular situation is allowed to join a game being executed mid-game depending on the situation of the game.

The game data obtaining unit 52 of this modification example obtains information about the past game play of a user who has not joined a game in question. This information may be obtained by other units than the game data obtaining unit 52. The information about past game play is information indicating the pattern of a user's game play, and can be rephrased as information indicating the history of the user's game play. The information about past game play is stored in, for example, the game data storage unit 50.

FIG. 8 is a figure illustrating users' game play patterns. As illustrated in FIG. 8, a plurality of play patterns are prepared here and, for each play pattern, the specifics of game play that match the play pattern are defined. For example, a play pattern to which a user's game play belongs is identified based on the result of a comparison between operation of the user in a game that the user has played in the past and game play specifics defined as described above. The identified play pattern may be stored as the information about the user's past game play in the game data storage unit 50.

The situation determining unit 56 of this modification example determines whether or not the situation of a game being executed satisfies a given condition based on the situation of the game being executed and the information about the past game play of a user who has not joined the game. FIG. 9 is a figure illustrating the association between a game situation and information about game play. The association of FIG. 9 is stored in the game data storage unit 50. The association may be in a numerical expression format or a table format.

The situation determining unit 56 determines whether or not the play pattern of a user who has not joined a game being executed matches a play pattern that is associated with the situation of the game, and, based on the result of the determination, determines whether or not the situation of the game being executed satisfies a given condition. For instance, it is determined that the given condition is satisfied when it is determined that the two match, and it is determined that the given condition is not satisfied when it is determined that the two do not match or are not associated with (similar to) each other.

According to the modification example (1-2), a user is allowed to join a game in mid-game under a situation suitable for the user's past game play. The functions of the game data obtaining unit 52 and the situation determining unit 56 that are described above in the modification example (1-2) are not indispensable, and may be omitted.

The modification described above deals with a case where the play pattern of a user who is allowed to join a game in mid-game is associated with a game situation. Alternatively, the play pattern of a user who is not to be allowed to join a game in mid-game may be associated with a game situation. In this case, too, in the same manner that is described above, the situation determining unit 56 determines whether or not the situation of a game being executed satisfies a given condition by comparing the situation of the game being executed with the information about the past game play of a user who has not joined the game. Specifically, it is determined that the given condition is satisfied when a play pattern associated with the situation of the game being executed does not match or is not associated with (similar to) the user's play patterns.

(1-3) In still another example, a user who has participated in a game with another user may wish to play a game again with the other user if the other user has taken an active part in the game. The user who has participated in the game may therefore be stored in association with the other participating user.

The game data obtaining unit 52 of this modification example obtains data stored in a unit for storing a user who has joined, mid-game, a game executed in the past in association with a user who has joined the game earlier. The stored data may be obtained by other units than the game data obtaining unit 52.

FIG. 10 is a figure illustrating the association between users who participate in a game. Data indicating the association is stored in the game data storage unit 50. The user IDs of the respective users are stored in the game data storage unit 50 in association with one another so that users who participate in a game are associated with one another. Another user associated with one user may be a user who has joined the game in mid-game or may be a user who has participated in the game from the beginning. This means that a user who has joined a game in mid-game and another user who has joined the game in mid-game may be stored in association with each other in the game data storage unit 50.

The game system S of this modification example may include the designation receiving unit 60. While a game is being executed, the designation receiving unit 60 receives, from a user who is participating in the game being executed, the designation of another user who is associated with this user. For example, the game system S presents to a user who is participating in a game other users associated with this user. The other users are presented by displaying information for identifying the other users who are associated with the participating user (e.g., a list of user IDs or user names). The designation receiving unit 60 receives the designation of one of the other presented users by obtaining the specifics of operation of the user participating in the game from the user device 2 of the user.

The situation determining unit 56 of this modification example determines whether or not the situation of a game being executed satisfies a given condition by comparing another user who is associated with a user participating in the game that is being executed with a user who is not participating in the game. For example, the situation determining unit 56 determines whether or not the other user who is associated with the user participating in the game that is being executed matches the user who is not participating in the game. It is determined that the given condition is satisfied when the other user who is associated with the user participating in the game that is being executed is determined as a match with the user who is not participating in the game. The other user who is an object of the comparison described above may be a user received by the designation receiving unit 60 which is designated out of other users who are associated with the user participating in the game that is being executed.

According to the modification example (1-3), one user and another user who has played with the user in the past can join the same game again. There is also a case where a user does not wish to play with some of other users who have played with the user in the past. By allowing only designated users out of the other users who have played with the user in the past to join mid-game, the user can arrange so that only users whom the user wish to play with again are allowed to join mid-game, whereas users whom the user does not wish to play with are excluded. The functions of the game data obtaining unit 52, the situation determining unit 56, and the designation receiving unit 60 that are described in the modification example (1-3) are not indispensable, and may be omitted.

(1-4) In yet another example, in the case where a game that ends at the arrival of a given end time is executed as in the embodiment, a user who joins a game in mid-game may not have a chance to take an active part if the remaining time period of the game is short. Therefore, whether or not to allow a user to join a game being executed mid-game may be determined based on whether or not the remaining time period of the game is sufficient.

The situation determining unit 56 of this modification example determines whether or not the situation of a game being executed satisfies a given condition by determining whether or not the remaining time period till the arrival of the end time of the game being executed is equal to or longer than a reference time period. The end time and the reference time period may each be a predetermined time, or the sum of a predetermined time and a time determined in accordance with the progress of the game (loss time in the case of a soccer game). The situation determining unit 56 refers to the game situation data to identify the remaining time period until the game ends. The situation determining unit 56 here identifies the remaining time period by comparing the elapsed time period of the game being executed and the end time of the game. It is determined that the given condition is satisfied when the remaining time period till the arrival of the end time of the game being executed is determined as equal to or longer than the reference time period.

According to the modification example (1-4), a user is allowed to join a game in mid-game in a state where the remaining time period is sufficient. The function of the situation determining unit 56 that is described in the modification example (1-4) is not indispensable, and may be omitted.

(2) In still another example, even though the embodiment has discussed a case in which a user who issues a mid-game joining request is kept from joining a game in mid-game by delaying the mid-game joining of the user, joining a game in mid-game may be restricted by stopping receiving mid-game joining requests in the first place.

The game system S of this modification example includes the mid-game joining receiving unit 62. The mid-game joining receiving unit 62 receives a request to join a game in mid-game from a user who has not joined the game. The mid-game joining request is issued when a user performs a given mid-game joining operation (for example, the action of selecting the "join mid-game" button 46). The mid-game joining receiving unit 62 receives a signal indicating a request to join a game in mid-game from the user device 2 that is operated by a user who has not joined the game.

The mid-game joining restricting unit 58 of this modification example restricts the reception of mid-game joining requests at the mid-game joining receiving unit 62 based on the result of the determination made by the situation determining unit 56. The mid-game joining restricting unit 58 thus keeps a user who has not joined a game being executed from joining the game in mid-game. "Restricting the reception of mid-game joining requests" is to keep (prevent) a user from performing the mid-game joining operation (for example, not displaying the "join mid-game" button 46 or disabling the "join mid-game" button 46), or restricting (preventing) the reception of mid-game joining request signals from the user devices 2.

According to the modification example (2), joining in a game in mid-game is restricted by restricting mid-game joining requests. The functions of the mid-game joining restricting unit 58 and the mid-game joining receiving unit 62 that are described in the modification example (2) are not indispensable, and may be omitted.

(3) In yet still another example, the competition room screen 40 may display an image that suggests joining mid-game to a user who has not joined a game. Displaying this image may be restricted depending on the game situation, to thereby restrict the mid-game joining of users.

The game system S of this modification example includes the suggestion unit 64. The suggestion unit 64 suggests joining a game in mid-game to a user who has not joined the game. "Suggesting joining a game in mid-game" is to prompt a user who has not joined the game to join mid-game, for example, presenting the situation of the game being executed to a user who has not joined the game. The suggestion unit 64 displays an image that prompts mid-game joining or changes the display mode of an image that indicates the situation of the game being executed (e.g., highlights the relevant detailed information image 42) on the competition room screen 40.

The mid-game joining restricting unit 58 keeps a user who has not joined a game that is being executed from joining the game in mid-game by restricting suggestions by the suggestion unit 64 based on the result of the determination made by the situation determining unit 56. "Restricting suggestions" is to prevent the suggestion unit 64 from suggesting to join a game in mid-game, for example, preventing the competition room screen 40 from displaying the image that prompts joining mid-game, from displaying the image that indicates the situation of the game being executed, or from changing the display mode of this image.

According to the modification example (3), joining in a game in mid-game is restricted by restricting suggestions for users who have not joined a game to join mid-game. The functions of the suggestion unit 64 and the mid-game joining restricting unit 58 that are described above are not indispensable, and may be omitted.

(4) In still another example, users who have not joined a game may be gathered by an operation performed by a user who is participating in the game.

While a game is being executed, the designation receiving unit 60 of this modification example determines whether or not a request to gather users who have not joined the game has been received from a user who is participating in the game. This determination processing may be executed by other units. The designation receiving unit 60 determines whether or not a user who is participating in the game has made a given gathering operation based on a signal received from the user device 2 of the user participating in the game.

The gathering request may be issued by the user participating in the game that is being executed by specifying the situation of the game (e.g., the elapsed time period of the game), or information about the user participating in the game or about the past game play of a user who has not joined the game.

The mid-game joining restricting unit 58 of this modification example keeps a user who has not joined a game being executed from joining the game in mid-game based on the result of the determination made by the situation determining unit 56 and the result of the determination made by the designation receiving unit 60. The mid-game joining restricting unit 58 keeps a user who has not joined a game being executed from joining the game in mid-game in the case where a given condition is not satisfied, or in the case where it is determined that a gathering request has not been received.

According to the modification example (4), when a user who is participating in a game issues a gathering request, other users are allowed to join mid-game. The modification example (3) and the modification example (4) may be combined so that whether or not to restrict suggestions by the suggestion unit 64 is determined based on the result of the determination made by the designation receiving unit 60. For instance, the competition room screen 40 may display the situation of a game being executed only when a user who is participating in the game issues a gathering request.

When it is determined that a gathering request has been received, the situation determining unit 56 of the modification example (4) receives votes from users who are participating in a game, except the user who has issued the gathering request. The votes may be received by other units. The votes indicate whether the users agree with or are opposed to the gathering request. The situation determining unit 56 receives a given voting operation performed by the other users than the one who has performed the gathering operation, based on signals received from the user devices 2 of other users than the one who has issued the gathering request.

The situation determining unit 56 may receive votes from other users than a user who has issued a gathering request within a period that is set when the gathering request is received. The period set when a gathering request is received is set based on the point in time at which the gathering request is received, for example, a period counted from the time of reception of the gathering request by a given length of time. The situation determining unit 56 restricts votes outside this period.

The mid-game joining restricting unit 58 keeps a user who has not joined a game being executed from joining the game in mid-game based on the result of the determination made by the situation determining unit 56 and the result of votes received by the situation determining unit 56. The mid-game joining restricting unit 58 restricts mid-game joining in the case where the voting result does not satisfy a given voting condition, and permits mid-game joining in the case where the voting result satisfies the given voting condition. The voting condition is a condition indicating whether or not the number of users who agree with the gathering request is equal to or more than a reference count, or a condition indicating whether or not the proportion of users who agree with the gathering request is equal to or more than a reference proportion.

A vote about a gathering request which is issued by a user who is participating in a game is taken in the manner described above. The wishes of all users participating in the game can thus be reflected on whether or not to allow other users to join the game. The functions of the situation determining unit 56, the mid-game joining restricting unit 58, and the designation receiving unit 60 that are described in the modification example (4) are not indispensable, and may be omitted.

(5) In still another example, a user who joins a game may be given a reward. In this case, a user who joins a game in mid-game in response to a gathering request issued by a user who is participating in the game may be given a higher reward than that of a user who joins the game in mid-game without receiving the gathering request.

The game system S of this modification example includes the reward giving unit 66. The reward giving unit 66 gives a reward to a user who has joined a game. "Giving a reward to a user" is to give an advantage to the user in the game, and equals changing a game parameter (e.g., an experience value associated with the user or a performance value of a character operated by the user), giving a game item to the user, or the like.

The reward giving unit 66 gives a higher reward to a user who joins a game in mid-game in the case where the user joins the game in mid-game in response to a gathering request (in the case where the user joins the game in mid-game after a gathering request is issued) than in the case where the user joins the game in mid-game without being requested by a gathering request (in the case where the user joins the game in mid-game before a gathering request is issued). "A high reward" is synonymous with "a large reward", and means that the amount of change of a game parameter relating to the user is large, that an expensive or rare game item is given to the user, or the like.

In the case where a user participating in a game issues a gathering request with a condition such as a game situation designated, the reward giving unit 66 may give a reward to a user who joins the game in mid-game based on the designated condition. For instance, the reward giving unit 66 may determine whether or not the designated condition is satisfied based on information about the past game play of the user who has joined mid-game and the situation of the game before and after the joining of the user mid-game so that, based on the result of the determination, the user who has joined mid-game is given a reward.

According to the modification example (5), a reward given to a user who joins the game in mid-game in response to a gathering request can be differentiated from a reward given to a user who joins the game in mid-game without receiving a gathering request. The function of the reward giving unit 66 that is described in the modification example (5) is not indispensable and may be omitted.

(6) In still another example, a user participating in a game may enter a condition about a user who they wish to join mid-game to present the condition to users who have not joined the game. For instance, a user who is losing a match may present a request for the mid-game joining of a user who is good at scoring a goal to users who have not joined the game.

While a game is being executed, the designation receiving unit 60 of this modification example receives the designation of a condition about a user who joins the game in mid-game from a user participating in the game. This condition is, for example, a condition indicating the pattern of a user's game play. The designation receiving unit 60 receives, for example, one of a plurality of play patterns that is selected by a user.

The suggestion unit 64 presents the designated condition to users who have not joined the game. The suggestion unit 64 displays an image that indicates a play pattern designated by the user who is participating in the game on the competition room screen 40 of the user device 2 of a user who has not joined the game. The user who has not joined the game checks this image displayed on the competition room screen 40 and decides whether or not to select the "join mid-game" button 46.

According to the modification example (6), a condition designated by a user who is participating in a game can be presented to users who have not joined the game. The functions of the designation receiving unit 60 and the suggestion unit 64 that are described above are not indispensable and may be omitted.

(7) In still another example, the game play of a user who joins a game in mid-game may be evaluated based on a change in the situation of the game before and after the mid-game joining.

The reward giving unit 66 of this modification example compares the situation of a game before a user joins the game in mid-game and the situation of the game after the user joins the game in mid-game. This comparison processing may be executed by other units.

The reward giving unit 66 compares game situation data at the time when a user joins a game in mid-game, or game situation data at a point in time that precedes the time of mid-game joining by a given length of time, with game situation data at a point in time that arrives after a given length of time since the time when the user joins the game in mid-game, to thereby obtain a change in the value of the game situation data. For example, the reward giving unit 66 determines whether or not the match situation after the user joins the game in mid-game is better than the match situation before the user joins the game in mid-game. "Match situation is better" means that a value indicating the situation of the game being executed (match situation) approaches a given value, thereby giving an advantage to the user in the game (e.g., increasing the game score). In a soccer game, a higher ball possession ratio or an increased score, for example, is equivalent to a better match situation.

Based on the result of the comparison described above, the reward giving unit 66 evaluates the game play of the user who has joined the game in mid-game. In other words, the reward giving unit 66 evaluates the game play of a user who joins a game in mid-game based on a difference (change) between the situation of the game before the user joins the game in mid-game and the situation of the game after the user joins the game in mid-game.

For example, the association between a result of the comparison described above (a change in the value of the game situation data) and an evaluation given to a user is stored in the game data storage unit 50. The association may be in a numerical expression format or a table format. The reward giving unit 66 gives the user an evaluation associated with the result of the comparison. For instance, the reward giving unit 66 gives a user who joins the game in mid-game a higher evaluation when the match situation after the mid-game joining of the user is better than the match situation before the mid-game joining of the user, than when the former is worse than the latter.

According to the modification example (7), the game play of a user who joins a game in mid-game can be evaluated based on a change in the situation of the game before and after the mid-game joining. The function of the reward giving unit 66 that is described above is not indispensable and may be omitted.

(8) In yet still another example, when a game in which a plurality of users participate and the plurality of users each belong to one of a plurality of groups (e.g., soccer teams) is executed as in the embodiment, to which group a user who joins the game in mid-game belongs may be determined so that an equal number of users belong to each group.

When a user issues a mid-game joining request and joins the game in mid-game, the game executing unit 54 of this modification example determines to which group the user who joins the game in mid-game belongs based on the numbers of users belonging to the respective groups. This determination processing may be executed by other units. For example, the game executing unit 54 chooses a group that has the smallest user count as a group to which a user who has issued a mid-game joining request and has joined the game in mid-game belongs. The game data storage unit 50 here stores information indicating which user belongs to which group. The game executing unit 54 refers to this stored information to identify, for each group, the number of users belonging to the group.

According to the modification example (8), the numbers of users belonging to the respective groups are prevented from becoming uneven when a user joins a game in mid-game. The function of the game executing unit 54 that is described above in the modification example (8) is not indispensable and may be omitted.

(9) In still another example, the data and the program that are stored in the storage unit 12 in the description given above may instead be supplied to the game server 1 via an external storage medium, or may be supplied to the game server 1 from another device over the network.

In still another example, two or more out of the embodiment and modification examples described above may be combined.

The embodiment described above deals with an example in which the game server 1 implements each function illustrated in the functional block diagram. Each function included in the game system S may be included in one of the game server 1 and the user devices 2. In other words, the functions illustrated in the functional block diagram may be divided between the game server 1 and the user devices 2. The devices constituting the game system S implement the functions described above by transmitting and receiving data as needed via the network or the like.

For example, the game data storage unit 50, the game data obtaining unit 52, and the game data executing unit 54 may be implemented by the user devices 2. In other words, processing relating to the soccer game may be executed in the user devices 2 instead of the game server 1. The control unit 20 in this case executes the soccer game by referring to data stored in the storage unit 22.

The situation determining unit 56 may be implemented by the user devices 2. The control unit 20 in this case transmits the result of the determination made by the situation determining unit 56 to the game server 1 via the network.

The mid-game joining restricting unit 58 may be implemented by the user devices 2. The control unit 20 in this case restricts the mid-game joining of a user by obtaining the result of the determination made by the situation determining unit 56 via the network.

The functions illustrated in the functional block diagram may be implemented by one game device. For example, a plurality of operation units may be connected to one game device so that a plurality of users each operate one of the plurality of operation units to play a game or to join, mid-game, a game being executed.

The embodiment described above deals with an example in which the game system S includes the game server 1 and the plurality of user devices 2. The game system S, however, does not need to include the game server 1. In this case, one of the plurality of user devices 2 serves as the game server 1. The game system S may also include, for example, a plurality of game servers 1. In this case, the plurality of game servers 1 execute processing according to the present invention while maintaining data consistency among one another.

Further, the description is given above by assuming the soccer game as the game executed in the game system S, but any game in which the plurality of users participate and which allows other users to join the game in mid-game may be used as the game executed in the game system S. Examples thereof may include an American football game, a basketball game, and a hockey game. Further, a game other than the sports games may be used, and examples thereof may include a first person shooting (FPS) game in which a plurality of users cooperate or compete with one another.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for executing a game in which a user participates and another user is allowed to join the game in mid-game, the game device comprising at least one central processing unit (CPU) configured to:
    obtain stored data from a storage that stores data that indicates a situation of the game being executed and that is updated with progress of the game;
    determine whether or not the situation of the game being executed satisfies a given condition; and
    keep a user who has not joined the game being executed from joining the game in mid-game, based on a result of the determination,
    wherein the game comprises a game in which the progress of the game is paused in a case where the situation of the game reaches a given situation,
    wherein the at least one CPU determines whether or not the situation of the game being executed satisfies the given condition by determining whether or not the progress of the game being executed is paused,
    wherein the at least one CPU receives a mid-game joining request to join the game in mid-game which is issued by a user who has not joined the game, and
    wherein the at least one CPU keeps the user who has not joined the game being executed from joining the game in mid-game by restricting the reception of the mid-game joining request based on the result of the determination.

2. The game device according to claim 1, wherein the at least one CPU determines whether or not the situation of the game being executed satisfies the given condition by comparing the situation of the game being executed and a given situation.

3. The game device according to claim 1, wherein the at least one CPU receives a designation of a situation of the game which is designated by a user who has participated in the game,
    wherein the at least one CPU determines whether or not the situation of the game being executed satisfies the given condition by comparing the situation of the game being executed and the situation designated by the user who has participated in the game.

4. The game device according to claim 1, wherein the at least one CPU obtains information about past game play of a user who has not joined the game,
    wherein the at least one CPU determines whether or not the situation of the game being executed satisfies the given condition based on the situation of the game being executed and the information about past game play of the user who has not joined the game.

5. The game device according to claim 1, wherein the at least one CPU obtains, from a storage, users who have participated in the game executed in the past in association with one another,
    wherein the at least one CPU determines whether or not the situation of the game being executed satisfies the given condition by comparing another user who is associated with a user participating in the game that is being executed with a user who is not participating in the game.

6. The game device according to claim 1,
    wherein the game comprises a game that ends in a case where a given end time arrives, and wherein the at least one CPU determines whether or not the situation of the game being executed satisfies the given condition by determining whether or not a remaining time period till the given end time of the game is equal to or longer than a reference time period.

7. The game device according to claim 1, wherein the at least one CPU suggests joining the game in mid-game to a user who has not joined the game,
wherein the at least one CPU keeps the user who has not joined the game being executed from joining the game in mid-game by restricting the suggestion based on the result of the determination.

8. The game device according to claim 7, wherein the at least one CPU presents the situation of the game being executed to the user who has not joined the game, to thereby suggest joining the game in mid-game to the user who has not joined the game.

9. The game device according to claim 1, wherein the at least one CPU determines whether or not a gathering request to gather a user who has not joined the game has been received from a user who is participating in the game during a period in which the game is being executed,
wherein the at least one CPU keeps the user who has not joined the game being executed from joining the game in mid-game based on the result of the determination of the situation of the game and a result of the determination of the gathering request.

10. The game device according to claim 9, wherein the at least one CPU receives, in a case where it is determined that the gathering request has been received, a vote from a user who is participating in the game, except the user who has issued the gathering request,
wherein the at least one CPU keeps the user who has not joined the game being executed from joining the game in mid-game based on the result of the determination of the situation of the game and a result of the vote.

11. The game device according to claim 10, wherein the at least one CPU receives the vote from the user who is participating in the game except the user who has issued the gathering request within a period that is set in the case where the gathering request has been received.

12. The game device according to claim 9, wherein the at least one CPU gives a reward to a user who joins the game, wherein the at least one CPU gives a higher reward to a user who joins the game in mid-game in response to the gathering request than in a case where the user joins the game in mid-game without being requested by the gathering request.

13. The game device according to claim 1, wherein the at least one CPU:
receives a designation of a condition about a user who joins the game in mid-game from a user who is participating in the game during a period in which the game is being executed; and
presents the designated condition to the user who has not joined the game.

14. The game device according to claim 1, wherein the at least one CPU:
compares, in a case where there is a user who joins the game in mid-game, the situation of the game before the user joins the game in mid-game and the situation of the game after the user joins the game in mid-game; and
evaluates game play of the user who joins the game in mid-game based on a result of the comparison.

15. The game device according to claim 1, wherein the game comprises a game in which a plurality of users participate and each user belongs to one of a plurality of groups, and
wherein the at least one CPU determines to which group a user who joins the game in mid-game belongs, based on the number of users of each group.

16. A game system for executing a game in which a user participates and another user is allowed to join the game in mid-game, the game system comprising at least one central processing unit (CPU) configured to:
obtain stored data from a storage that stores data that indicates a situation of the game being executed and that is updated with progress of the game;
determines whether or not the situation of the game being executed satisfies a given condition; and
keeps a user who has not joined the game being executed from joining the game in mid-game, based on a result of the determination,
wherein the game comprises a game in which the progress of the game is paused in a case where the situation of the game reaches a given situation,
wherein the at least one CPU determines whether or not the situation of the game being executed satisfies the given condition by determining whether or not the progress of the game being executed is paused,
wherein the at least one CPU receives a mid-game joining request to join the game in mid-game which is issued by a user who has not joined the game, and
wherein the at least one CPU keeps the user who has not joined the game being executed from joining the game in mid-game by restricting the reception of the mid-game joining request based on the result of the determination.

17. A game control method for controlling a game in which a user participates and another user is allowed to join the game in mid-game, the control method comprising:
obtaining stored data from a storage for storing data that indicates a situation of the game being executed and that is updated with progress of the game;
determining whether or not the situation of the game being executed satisfies a given condition; and
keeping a user who has not joined the game being executed from joining the game in mid-game, based on a result of the determination,
wherein the game comprises a game in which the progress of the game is paused in a case where the situation of the game reaches a given situation,
wherein the determining comprises determining whether or not the situation of the game being executed satisfies the given condition by determining whether or not the progress of the game being executed is paused,
wherein the at least one CPU receives a mid-game joining request to join the game in mid-game which is issued by a user who has not joined the game, and
wherein the at least one CPU keeps the user who has not joined the game being executed from joining the game in mid-game by restricting the reception of the mid-game joining request based on the result of the determination.

18. A non-transitory computer-readable information storage medium having recorded thereon a program for causing a computer for executing a game in which a user participates and another user is allowed to join the game in mid-game to perform the functions of:
obtaining stored data from a storage that stores data that indicates a situation of the game being executed and that is updated with progress of the game;
determining whether or not the situation of the game being executed satisfies a given condition; and keeping a user who has not joined the game being executed from joining the game in mid-game, based on a result of the determination, wherein the game comprises a game in which the progress of the game is paused in a case where the situation of the game reaches a given situation, wherein the determining comprises determining whether or not the situation of the game being executed satisfies the given condition by determining whether or not the progress of the game being executed is paused, wherein the at least one CPU receives a mid-game joining request to join the game in mid-game which is issued by a user who has not joined the game, and wherein the at least one CPU keeps the user who has not joined the game being executed from joining the game in mid-game by restricting the reception of the mid-game joining request based on the result of the determination.

19. A game device for executing a game in which a user participates and another user is allowed to join the game in mid-game, the game device comprising at least one central processing unit (CPU) configured to:

obtain stored data from a storage for storing data that indicates a situation of the game being executed and that is updated with progress of the game;

determine whether or not the situation of the game being executed satisfies a given condition; and keep a user who has not joined the game being executed from joining the game in mid-game, based on a result of the determination, wherein the at least one CPU determines whether or not the situation of the game being executed satisfies the given condition by determining whether or not the progress of the game being executed is paused, wherein the at least one CPU receives a mid-game joining request to join the game in mid-game which is issued by a user who has not joined the game, and wherein the at least one CPU keeps the user who has not joined the game being executed from joining the game in mid-game by restricting the reception of the mid-game joining request based on the result of the determination.

20. A game device for executing a game in which a user participates and another user is allowed to join the game in mid-game, the game device comprising at least one microprocessor configured to:

obtain stored data from a storage for storing data that indicates a situation of the game being executed and that is updated with progress of the game;

determine whether or not the situation of the game being executed satisfies a given condition; and keep a user who has not joined the game being executed from joining the game in mid-game, based on a result of the determination, wherein the game comprises a game in which the progress of the game is paused in a case where the situation of the game reaches a given situation, wherein the at least one microprocessor determines whether or not the situation of the game being executed satisfies the given condition by determining whether or not the progress of the game being executed is paused, wherein the at least one CPU receives a mid-game joining request to join the game in mid-game which is issued by a user who has not joined the game, and wherein the at least one CPU keeps the user who has not joined the game being executed from joining the game in mid-game by restricting the reception of the mid-game joining request based on the result of the determination.

* * * * *